Nov. 23, 1943.  F. H. HOPKINS  2,335,063
CLOSURE FOR MEASURING INSTRUMENT CASES
Filed Jan. 27, 1942   2 Sheets-Sheet 1

Inventor
Frank H. Hopkins
by Roberts, Cushman & Woodbury
attys.

Nov. 23, 1943.   F. H. HOPKINS   2,335,063
CLOSURE FOR MEASURING INSTRUMENT CASES
Filed Jan. 27, 1942   2 Sheets-Sheet 2

Inventor
Frank H. Hopkins
by Roberts, Cushman & Woodbury
att'ys.

Patented Nov. 23, 1943

2,335,063

UNITED STATES PATENT OFFICE 2,335,063

CLOSURE FOR MEASURING INSTRUMENT CASES

Frank H. Hopkins, Fairfield, Conn., assignor to Manning, Maxwell & Moore, Inc., New York, N. Y., a corporation of New Jersey Application January 27, 1942, Serial No. 428,370

1 Claim. (Cl. 73—151)

This invention relates to pressure gauges, dial thermometers or instruments of generally similar construction wherein a pointer or index is moved over a graduated dial by mechanism housed within a protective casing, the latter having a removable transparent front panel, and relates more especially to novel means for securing the front panel to the body portion of the casing. Since the present invention is of particular utility when embodied in an instrument case of the kind described in the patent to Graesser et al. No. 2,294,175, dated August 25, 1942, it is so disclosed herein but without limiting intent.

In the patent just referred to the body of the instrument case is described as an integral unitary structure moulded from a suitable plastic material, for example one of the synthetic resins. This moulded case has an external surface which tapers forwardly from a point near its back wall to its forward edge, the front edge of the case being thin and smoothly rounded and the side wall of the case increasing in radial thickness rearwardly from said edge and having nitches in its thicker rear portion for the reception of attaching elements. The outer surface of the case is smooth and free from flanges or projections and the case has therein a substantially cylindrical chamber for the reception of the gauge movement. The thin front portion of the wall of the case has an internal recess providing for disposal of the edge of the transparent panel and of panel-retaining means in a plane behind the plane of the extreme front edge of the case. This internal recess is illustrated in said application as having spaced circumferential grooves in its peripheral wall, the edge of the transparent panel being located between the grooves. A resilient split metallic cushioning ring is arranged in the rear groove and a split metallic retaining ring is placed in the forward groove. Such an arrangement as that illustrated in the aforesaid patent is highly desirable and useful, especially in situations where the instrument is given proper care and is located in clean and reasonably dust-free surroundings—for example, in the engine or control room of a naval vessel. However, for industrial uses, where such instruments are given little care and are often located in a dusty and moist atmosphere, the means disclosed in the aforesaid application for removably retaining the transparent panel in place is not always sufficient to insure a tight seal such as to prevent entry of dust, moisture or injurious fumes to the interior of the gauge casing.

One principal object of the present invention is to provide improved means for so securing the transparent panel to the body of the case as substantially to seal the interior of the case against entry of dust or moisture.

A further object is to provide improved panel-retaining means of a kind permitting the application of a substantial degree of pressure between the surface of the panel and the sealing means thereby to insure an effective seal, but without unduly limiting the area of the dial which is visible from the front of the instrument.

A further object is to provide a useful and effective form of bezel ring engaging the outer surface of the case and operative to hold the transparent panel in place but which does not substantially detract from the appearance of the case or appreciably increase the apparent thickness of the forward edge of the case.

A further object is to provide an improved sealing gasket designed to provide a tight seal between the rear face of the transparent panel and the adjacent surface of the case, said gasket being transversely compressible but of such nature that it can not readily escape from the groove provided for its reception and which provides a resilient cushion for the panel.

Other and further objects and advantages of the invention will be pointed out in the following more detailed description and by reference to the accompanying drawings wherein.

Figure 4:
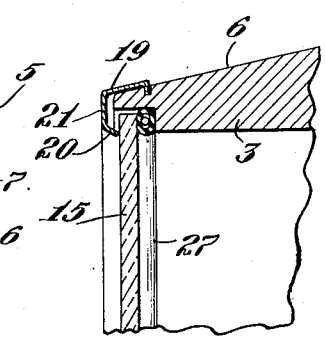
Fig. 4 is a fragmentary radial section through the side wall of the case showing the panel-retaining bezel and the sealing ring in place.
Figure 9:
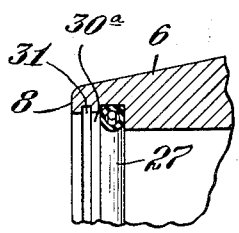
Figure 10:
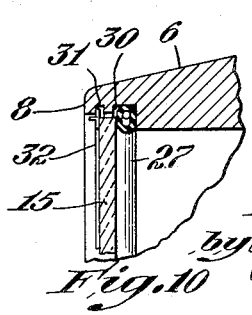
Figure 8:
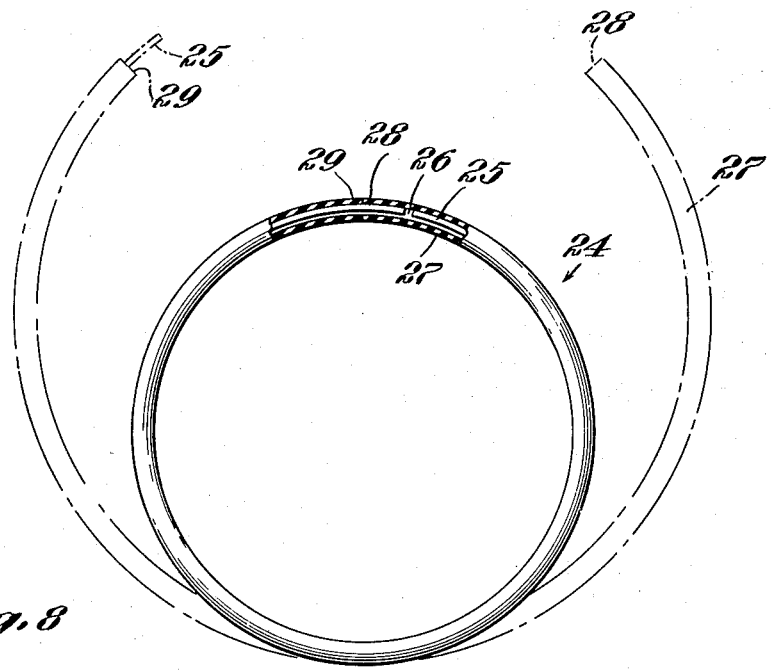
Fig. 8 is an elevation, partly in section, of the improved sealing ring or gasket, showing it in full lines with the ends of the resilient tubular portion of the ring in contact, and showing it in broken lines as it appears before placing it in the case.

Fig. 9 is a section similar to Fig. 4 but showing the improved sealing ring of Fig. 8 applied to a case of another type, the ring being shown as it appears when first introduced into the groove designed to receive it; and Fig. 10 is a view similar to Fig. 9 but showing the sealing ring, the transparent panel and the retaining ring in operative assembled relation, the sealing ring being transversely compressed.

Figure 1:
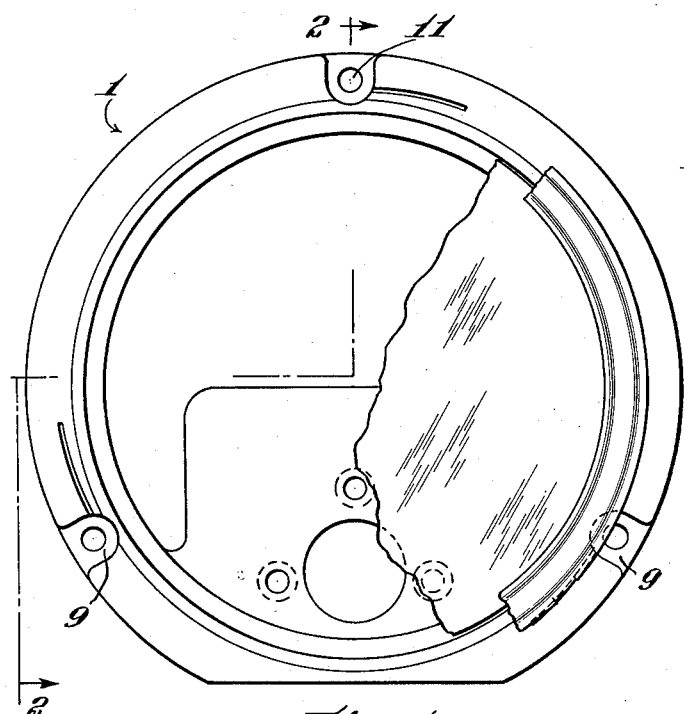
Fig. 1 is a front elevation illustrative of one desirable embodiment of a casing useful in the practice of the present invention, a portion of the transparent panel and dial being broken away and the bezel ring being removed.
Figure 2:
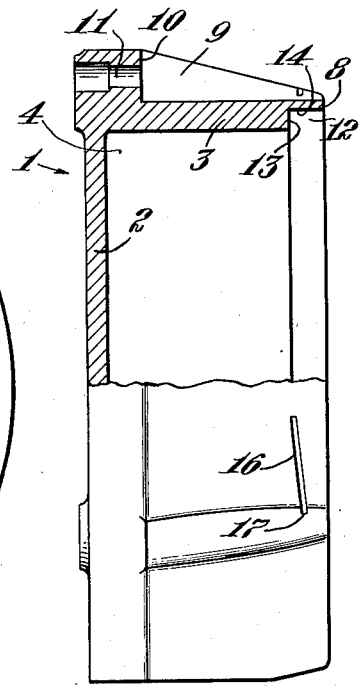
Fig. 2 is a side elevation, partly in section on the line 2—2 of Fig. 1.

Referring to the drawings, the numeral 1 designates an instrument case, for example the case of a pressure gauge, dial-thermometer or the like. As illustrated by way of example, this case is of unitary construction, being moulded from a non-metallic plastic material, for example one of the synthetic resins, and comprises the rear wall 2 (Fig. 2) and the side wall 3, said walls defining a substantially cylindrical chamber 4 for the reception of the operative instrumentalities (not shown), for instance a Bourdon tube, movement mechanism and movable index. The case proper is open at the front, but the chamber 4 is closed (in the completed instrument) by means of a front panel of transparent material, for example glass or a transparent organic material. The case here chosen for illustration is flangeless, that is to say, it is unprovided with the usual radial attaching flange, and its outer surface is smooth and substantially free from projections. The wall 3 of the case increases in thickness rearwardly from the forward edge of the case, and, as here illustrated, its outer surface comprises the substantially cylindrical rear portion 5 (Fig. 3) and the forwardly tapering portion 6, said portions 5 and 6 merging at 7 in a smooth curve. The front edge 8 of the wall of the case is quite thin (Fig. 9) and is smoothly finished. The outer surface of the case is provided with a plurality of rearwardly extending, fastener-receiving nitches 9 (Fig. 3), such nitches being symmetrically spaced and each having a bottom wall 10 (Fig. 2) integral with the material of the case, said bottom wall having a hole 11 for the reception of an attaching bolt or screw.

Figure 3:
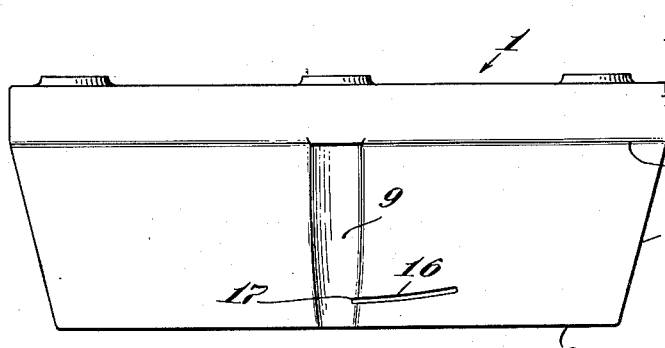
Fig. 3 is a plan view of the case shown in Fig. 1 but illustrating a slight modification.

The forward part of the wall 3 of the case is shaped to provide an internal rabbet 12 (Fig. 2), such rabbet having the rear or inner wall or shoulder 13 and the outer circumferential wall 14, the diameter of this rabbet being less than the minimum external diameter of the case. This rabbet is designed for the reception of the edge of the transparent panel 15 (Fig. 4). This panel is of a diameter greater than that of the chamber 4 but less than the minimum external diameter of the case and the egde of the panel is disposed within the thickness of the thin forward portion of the wall of the case. The tapering outer surface 6 of the case is provided with a plurality of elongate narrow grooves or recesses 16 (Fig. 2), said grooves or recesses being inclined relatively to the plane of the front edge of the case. While herein shown as substantially straight, these grooves may constitute partial screw threads, that is to say, they may be of helical form (Fig. 3). The forward ends 17 of these recesses or grooves are spaced rearwardly from the front edge of the case and open into the nitches 9, one of the recesses 16 leading from each of the nitches.

Figure 7:
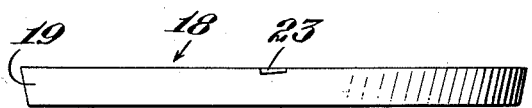
Fig. 7 is a plan view of the ring shown in Fig. 5.
Figure 5:
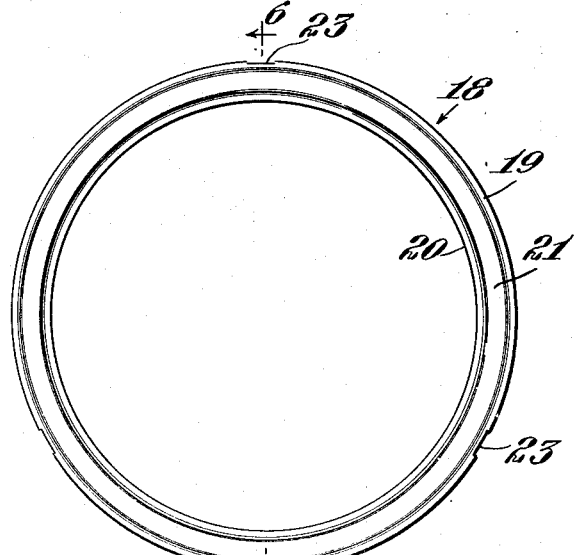
Fig. 5 is a front elevation of the bezel ring removed from the case.
Figure 6:
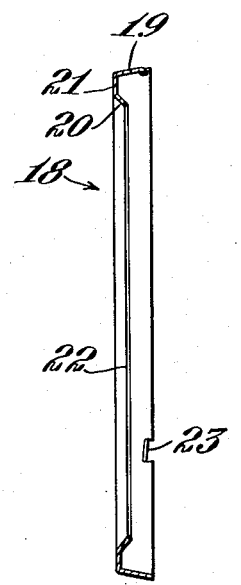
Fig. 6 is a section on the line 6—6 of Fig. 5.

For retaining the transparent panel in place, there is provided a bezel ring 18 (Figs. 5, 6 and 7). This bezel ring is preferably of thin sheet material, for example stainless steel, and comprises concentric outer and inner flanges 19 and 20 integrally united to the outer and inner edges respectively of an annulus 21, the flanges 19 and 20 diverging rearwardly from this annulus 21. The taper of the outer flange 19 and its diameter are such that the forward thin edge portion of the case of the instrument may nest snugly within this flange 19, as illustrated in Fig. 4. The flange 20 is of such diameter and extends rearwardly to such a depth that when the parts are assembled its inner edge 22 bears against the front face of the panel 15. The outer flange 19 is provided with a plurality of circumferentially spaced, inwardly directed retaining elements 23, here shown as integral tabs struck inwardly from the material normally forming the rear edge portion of the flange. Preferably these tabs 23 are inclined corresponding to the inclination of the slots 16. In assembling the parts, the bezel ring 18 is so oriented relatively to the casing that the retaining elements 23 may be moved rearwardly into the forward ends of the nitches 9. When the retaining elements 23 have been brought opposite to the forward ends 17 of the slots 16, the bezel ring is partially rotated, thus causing the elements 23 to enter the slots 16. By reason of the inclination of these slots, continued rotation of the bezel ring relative to the case generates a force which causes the bezel ring to move axially rearward with respect to the case, thus urging the inner edge 22 of the bezel ring against the panel 15 with substantial pressure.

Between the rear surface of the panel 15 and the bottom wall or shoulder 13 of the rabbet 12 there is interposed a sealing annulus or gasket 24 (Fig. 8). This sealing gasket, as here illustrated, comprises an inner core ring 25 of stiffly resilient, relatively hard material, for example spring wire, this core ring being split at the point 26 so that the ends of the wire are separable, the ring being of considerable resiliency and tending to expand with a substantial degree of force. The gasket also comprises an outer tubular ring 27 of a relatively soft and preferably elastically yieldable material such as vulcanized rubber. For example, this outer ring 27 may be a length of rubber tubing. Preferably, the bore of this tubing is somewhat greater in diameter than the transverse thickness or diameter of the wire forming the core 25 so that the outer tubular ring 27 may be deformed transversely when subjected to pressure. The core ring 25 is so disposed within the outer tubular ring 27 that the split 26 in the core ring is offset circumferentially with reference to the adjacent ends 28 and 29 of the outer member, the latter ends preferably abutting when the gasket is in place. Before the gasket is introduced into the casing, it may assume the form shown in broken lines in Fig. 8, but before introducing it, the ends 28 and 29 are brought together, the end 28 being telescoped over the projecting end portion of the core ring 25 and then the composite gasket is pushed into the rabbet 12 until it rests against the shoulder 13. The tendency of the core ring 25 to expand is such that the gasket will remain in position in the rabbet 12 without danger of displacement. The ends of the core member 25 at the split 26 are normally so close together that by reason of their confinement within the outer tubular member 27 there is substantially no possibility that the composite gasket can be radially contracted sufficiently to permit it to be crowded inwardly into the chamber 4.

When the gasket is first installed in the case, the tubular outer member 27 is of substantially circular transverse section (as indicated in Fig. 9), but when the panel 15 is put in place and the bezel 18 is rotated as far as it will go, the outer member 27 of the gasket is transversely deformed to a more or less elliptical section, as shown in Fig. 4, thus providing a very adequate seal to prevent the entrance of dust or moisture into the interior of the case, and at the same time exerting such forward pressure against the panel 15 as to insure against rattling and also against the accidental loosening of the bezel ring 18 even though the instrument may be subjected to constant and extreme vibration when in use.

Thus, although the case thus described and illustrated is of substantially the same type as that disclosed in the above-mentioned Patent No. 2,294,175, insofar as its basic construction is concerned, and also in respect to its outer appearance, a very thorough and adequate sealing of the interior of the case is provided by the present invention. Furthermore, although a bezel ring is employed for holding the transparent panel in place, nevertheless this bezel ring is of such a character that it does not add substantially to the apparent thickness of the forward edge portion of the case nor detract from the desired esthetic appearance of the case, nor in fact increase its actual diameter to any substantial extent. Moreover, this bezel ring is so devised that it does not substantially decrease the visible area of the dial of the instrument so that the completed device has all of the advantages of that disclosed in the aforesaid application, with the further advantage of efficient sealing of the interior of the case against the entrance of dust, moisture or injurious fumes.

While the construction above described is preferred, it is contemplated that the composite gasket 24 herein disclosed may be of utility in other situations. For example, as illustrated in Figs. 9 and 10, this gasket is shown as arranged within the rear groove 30 of an internal rabbet 30ᵃ (Fig. 9) such as that described in the aforesaid copending application, said rabbet also having a forward groove 31 which receives a snap ring 32 (Fig. 10), by means of which the transparent panel 15 is retained in place. In this instance the front-to-rear distance between the bottom wall of the rabbet and the forward wall of the groove 31 is such that when the parts are assembled and the snap ring 32 is in place, the outer member 27 of the composite gasket is deformed from a circular contour and is under substantial compression, thereby exerting a forward force against the transparent panel such as to prevent rattling. In this arrangement the composite gasket functions as a cushioning ring and to some extent at least performs a sealing function although such sealing would not ordinarily be as effective as though the panel were forced backwardly against this sealing gasket by means of the bezel ring of Fig. 4.

While the means for uniting the bezel ring to the casing as here disclosed consists of the lugs 23 and the slots 16, it is contemplated that equivalent means may be employed, for example, that the slots 16 be conventional bayonet slots, although the arrangement herein disclosed is that which is preferred.

While certain desirable embodiments of the invention have been illustrated by way of example, it is to be understood that the invention is not necessarily limited to these precise embodiments but is to be regarded as broadly inclusive of any and all equivalents falling within the terms of the appended claim.

I claim:

An instrument case of the kind which has a non-metallic, flangeless body portion of a truncated and smooth, substantially conical exterior contour and a removable bezel ring for retaining a transparent front panel, the forward portion of the body of the case being provided with an annular, substantially cylindrical internal rabbet for the disposal of the edge of the transparent panel, the front edge of the body portion of the case being thin and smooth and the exterior surface of said body portion having circumferentially spaced fastener-receiving nitches extending from its forward edge rearwardly, the outer surface of the body of the case also having a plurality of elongate narrow grooves for the reception of bezel-retaining elements, each of said grooves being interposed between adjacent nitches, the grooves being inclined relatively to the front edge of the case, characterized in that the forward ends of said grooves are spaced rearwardly from the front edge of the case, each groove opening at its forward end into one of the respective nitches, and further characterized in that the bezel ring is of thin, resilient material and comprises concentric outer and inner flanges integrally united to the outer and inner edges respectively of an annulus, the flanges diverging rearwardly from the annulus and the taper of the outer flange and its diameter being such that the forward thin edge portion of the body of the case of the instrument may nest snugly within this flange, the inner flange being of such diameter and extending rearwardly to such a depth from the annulus that when the parts are assembled its rear edge bears against the front face of the transparent panel, the outer flange being provided with a plurality of circumferentially spaced inwardly directed retaining elements, said elements being integral elongate tabs struck inwardly from the material normally forming the rear edge portion of the flange, said tabs being inclined corresponding to the inclination of the adjacent grooves in the outer surface of the body of the case.

FRANK H. HOPKINS.